UNITED STATES PATENT OFFICE.

CARL PAAL, OF ERLANGEN, GERMANY, ASSIGNOR, BY MESNE ASSIGNMENTS, TO THE HYDROGENATION COMPANY, OF CINCINNATI, OHIO, A CORPORATION OF OHIO.

PROCESS OF MAKING A CATALYZING AGENT FOR THE REDUCTION OF FATS AND UNSATURATED FATTY ACIDS.

1,222,660.     Specification of Letters Patent.     Patented Apr. 17, 1917.

No Drawing.     Application filed March 18, 1911. Serial No. 615,282.

*To all whom it may concern:*

Be it known that I, CARL PAAL, doctor of philosophy, professor of chemistry, a subject of the King of Bavaria and the German Emperor, residing at 14 Oestliche Stadtmauerstreet, Erlangen, Kingdom of Bavaria, German Empire, have invented a new and useful Improvement in Processes of Making a Catalyzing Agent for the Reduction of Fats and Unsaturated Fatty Acids; and I do hereby declare the following to be a full, clear, and exact description of the same.

This invention relates to a process for the reduction of fats and unsaturated fatty acids.

As has been shown by C. Paal and Karl Roth (*Berichte Chemischen Gesellschaft* Volume XXXXI, page 2282 (year 1908); Volume XXXXII, page 1541 (year 1909), fats and fatty acids (oleic acid) are hydrogenized by means of the colloidal palladium prepared according to the process of C. Paal and Conrad Amberger (*Berichte Chemischen Gesellschaft* Volume XXXVII, page 124 (year 1904); Volume XXXVIII, page 1398, (year 1905)), in presence of hydrogen, by which means the larger or smaller amounts of the glycerin ester of the unsaturated fatty acids contained in all animal and vegetable fats, and the glycerids of unsaturated oxy-fatty acids present in many fats (castor oil), are transformed into the glycerids of the corresponding saturated fatty acids. Analogous behavior is exhibited by the free unsaturated fatty acids and oxy-fatty acids, these being reduced by colloidal palladium and hydrogen to the saturated acids.

The technical application of this method of Paal and Roth to the catalytic reduction of the fats and unsaturated fatty acids is, however, hindered by the high price of colloidal palladium which, after each hydrogenization is transformed into the inactive gel form by the procedure necessary for isolating the product of the reduction. Moreover, for the reduction, the fats must be converted into emulsions prepared by means of gum arabic, and the unsaturated fatty acids must be converted into aqueous solutions of their alkali salts. In order to reduce large quantities of these substances, very large volumes of liquid are therefore required. The recovery of the valuable gum arabic is also a tedious and expensive process. If attempts be made to replace gum arabic by other, cheaper, emulsifying agents—for example, solutions of soap or of saponin—the fatty emulsions thereby obtained are not reduced by palladium sol and hydrogen.

I have now discovered a process for reducing fats and unsaturated fatty acids, in which all the above mentioned circumstances that hinder the industrial application of the method of Paal and Roth are obviated. The process is based on the use of finely divided metals of the platinum group or hydroxids of same, precipitated by the wet method on substances devoid of anticatalytic action. The metals or hydroxids capable of being used are: palladium, platinum, iridium, rhodium, ruthenium and osmium, or mixtures of same. For instance, use may be made of palladium or platinum obtained by the action of aqueous solutions of palladium salts upon aqueous suspensions of finely divided metals (for instance magnesium, nickel or cobalt) that have no anticatalytic action. Use may also be made of the product of the action of palladium salts, or platinum salts, in solution, upon aqueous suspensions of finely divided metallic oxids or metallic carbonates, that are insoluble in water, in some cases after reduction treatment. Usable reducing agents can also be obtained by bringing an aqueous solution of an inorganic salt and palladium salt (or platinum salt) into action with an aqueous solution of a second inorganic salt capable of reacting on the first inorganic salt, with or without the addition of a reducing agent. Substances that are insoluble in water and have no anticatalytic action, may also be impregnated with a solution of a salt of palladium or platinum, then treated with soda solution, and thereafter reduced if necessary.

The following method may be adopted in the preparation of the catalyzers:

1. *When metals are used as the vehicle or carrier.*—100 parts of powdered nickel or magnesium are suspended in 1000 parts of water, and treated with a solution of 0.9 part of palladium dichlorid $PdCl_2$ (equivalent to 0.5 part of Pd), or 0.7 part of platinum dichlorid $PtCl_2$ (equivalent to 0.5 part of Pt) in 50 parts of water. Palladium or platinum is precipitated on the powdered metal, while a quantity of the metal equivalent to the $PtCl_2$ or $PdCl_2$ consumed passes into solution as chlorid.

*2. When oxids or carbonates are used as the vehicle or carrier.*—100 parts of precipitated magnesium oxid, magnesium carbonate or calcium carbonate are suspended in 500 parts of water and digested with an aqueous solution (containing a minimum of free hydrochloric acid) of 1.7 parts of palladium dichlorid $PdCl_2$ ($=1$ part of Pd) or 2.9 parts of platinum dichlorid $PtCl_2$ ($=2$ parts of Pt), in 400 parts of water. Palladium proto-hydroxid or platinum proto-hydroxid is precipitated on the oxid or carbonate in excess. After washing with water, the products are dried at a gentle heat, below 100° C.

*3. When inert substances other than metals, oxids or carbonates are used as the vehicle or carrier.*—100 parts of calcined kieselguhr or purified wood meal are stirred up with a solution of 3.4 parts of $PdCl_2$ ($=2$ parts of Pd) or 5.8 parts of $PtCl_2$ ($=4$ parts of Pt) in 500 parts of water, and digested with 800 parts of a warm 2% solution of soda.

If 100 parts of barium sulfate, very finely powdered talc or powdered carbon be used, they are preferably stirred with an aqueous solution of 1.7 parts of $PdCl_2$ ($=1$ part of Pd), or 2.9 parts of $PtCl_2$ ($=2$ parts of Pt)—40 or 70 parts of water being used in the case of palladium, and 70 or 150 parts in the case of platinum—, the mixture being then digested with 400 parts of warm solution of soda containing 2 per cent.

After precipitation is completed, the substances are washed with water, filtered, and the residue dried at the lowest possible temperature.

If it be desired to prepare the said materials with the element palladium or metallic platinum in place of the palladium proto-hydroxid or platinum proto-hydroxid, then a suitable reducing agent is added to the soda solution, for example, hydroxylamin chlorid or hydrazin chlorid in slight excess, the further treatment being as already described.

The reduction of fats and unsaturated fatty acids is extremely simple when these catalyzers are used. The above described palladiferous or platiniferous hydrogen-carriers are mixed with the fluid or warmed and liquefied fat or with the unsaturated fatty acids, and the mixture exposed to hydrogen—preferably out of contact with air, and assisted by stirring and also, if required, by pressure and heat—so long as absorption of hydrogen continues. The product of the reaction is then, for instance by means of suitable filtering devices, separated from the hydrogen carrier, which can then be used over again without further treatment.

The duration of the reduction depends not only on the presence of larger or smaller quantities of glycerids of highly unsaturated fatty acids in the fats (fats with high iodin value), but also on the special nature of the fats.

The velocity of the reduction also depends on the amount of the catalyzers and on the pressure, as well as on the temperature at which the action of the hydrogen is exerted. One part of palladium, used in the form of the above described preparations, is sufficient to transform a hundred thousand parts of fat or unsaturated fatty acid into hard, brittle masses in a few hours. The other metals of the platinum group have a similar action.

When it is desired to effect the reduction in the shortest possible time, the hydrogen may be preferably used under a pressure of 2 to 3 atmospheres. Nevertheless, the reduction will proceed in a satisfactory manner, even without pressure.

The temperature is preferably maintained at a level slightly above the solidification point of the product of the reaction.

Anticatalytics, which more or less completely deprive palladium or metallic platinum of their function as carriers of hydrogen, such for instance as arsenic and its compounds, phosphoreted hydrogen, sulfureted hydrogen, free mineral acids, and also liquid hydrocarbons, chloroform, acetone and carbon disulfid, should be avoided.

After being used once for reduction purposes, the activity of the catalyzers containing palladium proto-hydroxid or platinum proto-hydroxid is considerably increased.

Examples.

*1. The reduction of fats.*

1000 kilos. of castor oil are mixed with 1 kilo. of a catalyzer containing 1 per cent. of palladium or 2 per cent. of platinum in the form of metal or proto-hydroxid, and this mixture of fat and catalyzer is placed in a hermetically closed autoclave. The air in the autoclave is then exhausted as completely as possible, and hydrogen is admitted under a pressure of 2 to 3 atmospheres, the stirring apparatus is set going, and the autoclave is heated to about 80°. The progress of the reduction, indicated by the consumption of hydrogen, can be followed by reading the diminution of pressure on the pressure gage.

If the gage pressure continues to decrease, more hydrogen is admitted. The completion of the process can be recognized by the gas pressure remaining constant for some considerable time. When the reduction process is ended, the product of the reduction is separated from the catalyzer in a filter press which is adapted to be heated. The catalyzer can then be used again.

By means of the above described process of reduction, fats of all kinds, both of animal and vegetable origin, can be hydrogenized. The reduction products form hard, tallowy or brittle, pulverizable masses.

The reduction process may also, of course, be carried on in such a manner that only partial reduction ensues. These partially reduced fats then exhibit a lowered melting point and a consistency resembling ointment.

The degree of hydrogenization can be determined by ascertaining the iodin value.

2. *The reduction of unsaturated fatty acids.*

The reduction is performed in exactly the same manner as described above for the fats. The catalyzers preferably used are only such palladiferous or platiniferous hydrogen-carriers as are not attacked by the acids in the process itself. For instance, use may be made of the preparation obtained from a mixture of barium chlorid and palladium dichlorid or platinum dichlorid, by displacement with sodium sulfate in presence of alkaline hydroxylamin or hydrazin. Palladium, platinum or their proto-hydroxids, precipitated on calcium carbonate, kieselguhr or wood meal, are also suitable. By means of this reduction process the various unsaturated fatty acids and fatty-acid mixtures, such as are obtained by the saponification of all kinds of fats, for instance, technical oleic acid, ricinoleic acid, linolic acid, the acids of soja bean oil, the acids of fish oils, etc., can be hydrogenized, and thereby transformed into the solid, saturated fatty acids or fatty-acid mixtures.

1000 kilos. of oleic acid are mixed with 1 kilo. of a catalyzer containing 1% of palladium or 2% of platinum, in the form of metal or proto-hydroxid, and this mixture of fatty acid and catalyzer is hermetically sealed in an autoclave, the process being, in other respects, the same as given under 1.

It sometimes happens that, as a result of the stirring during the reduction process, particles of the catalyzer vehicle, and also small quantities of palladium or platinum get into the reduced fat or fatty acids, in such a fine state of division that these extremely fine particles are not retained by the filter. In such cases the reduction product is warned (for instance with a little dilute hydrochloric acid in which a small quantity of alumina has been dissolved) for a short time with powerful stirring. The powerful electrolytes, aluminium chlorid and hydrochloric acid, effect the agglomeration of the finely divided particles in the fat, and the hydrochloric acid at the same time dissolves the greater portion of the flocculated palladium or platinum. By washing the solidified reduction product with water, and then filtering the said product after melting same, the flocculated particles are separated therefrom, and in this way the reduced fat or fatty acid, on the one hand, is purified, while on the other hand the valuable palladium or platinum that has been partially flocculated and partially dissolved in the hydrochloric solution, is recovered.

I claim:

1. The process of making a catalyzing agent having a high degree of activity in the hydrogenation of unsaturated fatty compounds, which consists in suspending an insoluble material devoid of anticatalytic action in an aqueous liquid, and precipitating thereon a relatively small proportion of a substance containing a metal of the platinum group.

2. The process of making a catalyzing agent having a high degree of activity in the hydrogenation of unsaturated fatty compounds, which consists in suspending a finely-divided metal devoid of anticatalytic action in an aqueous liquid, and precipitating thereon a relatively small proportion of a substance containing a metal of the platinum group.

3. The process of making a catalyzing agent having a high degree of activity in the hydrogenation of unsaturated fatty compounds, which consists in suspending finely-divided nickel in an aqueous liquid, and precipitating thereon a relatively small proportion of a substance containing a metal of the platinum group.

4. The process of making a catalyzing agent having a high degree of activity in the hydrogenation of unsaturated fatty compounds, which consists in suspending an insoluble material devoid of anticatalytic action in an aqueous liquid, and precipitating thereon a relatively small proportion of a substance containing palladium.

5. The process of making a catalyzing agent having a high degree of activity in the hydrogenation of unsaturated fatty compounds, which consists in suspending a finely-divided metal devoid of anticatalytic action in an aqueous liquid, and precipitating thereon a relatvely small proportion of a substance containing palladium.

6. The process of making a catalyzing agent having a high degree of activity in the hydrogenation of unsaturated fatty compounds, which consists in suspending finely-divided nickel in an aqueous liquid, and precipitating thereon a relatively small proportion of a substance containing palladium.

7. A catalyzing agent having a high degree of activity in the hydrogenation of unsaturated fatty compounds, and comprising a metal of the platinum group precipitated upon a finely-divided metal devoid of anticatalytic action.

8. A catalyzing agent having a high degree of activity in the hydrogenation of unsaturated fatty compounds, and comprising a metal of the platinum group precipitated upon finely-divided nickel.

9. A catalyzing agent having a high degree of activity in the hydrogenation of unsaturated fatty compounds, and comprising palladium precipitated upon a finely-divided metal devoid of anticatalytic action.

10. A catalyzing agent having a high degree of activity in the hydrogenation of unsaturated fatty compounds, and comprising palladium precipitated upon finely-divided nickel.

In testimony whereof, I have signed my name to this specification in the presence of two subscribing witnesses.

CARL PAAL.

Witnesses:
MAX BUSEN,
HERMANN AGITYSCH.